Aug. 29, 1967   R. ZIEGENBEIN   3,338,432
ARRANGEMENT FOR REMOVING POURABLE GOODS FROM A STORAGE PLACE
Filed Aug. 4, 1965   2 Sheets-Sheet 1
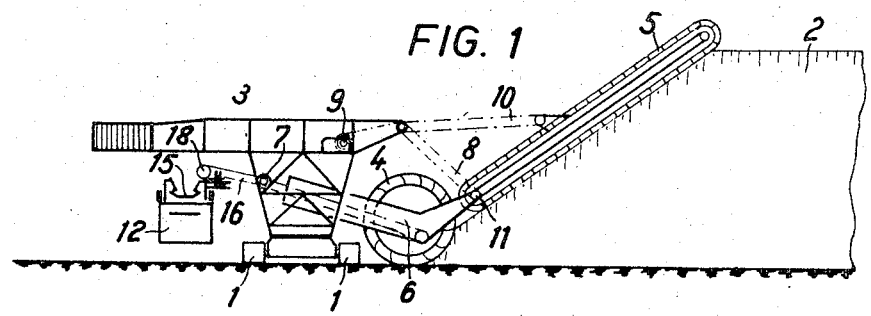
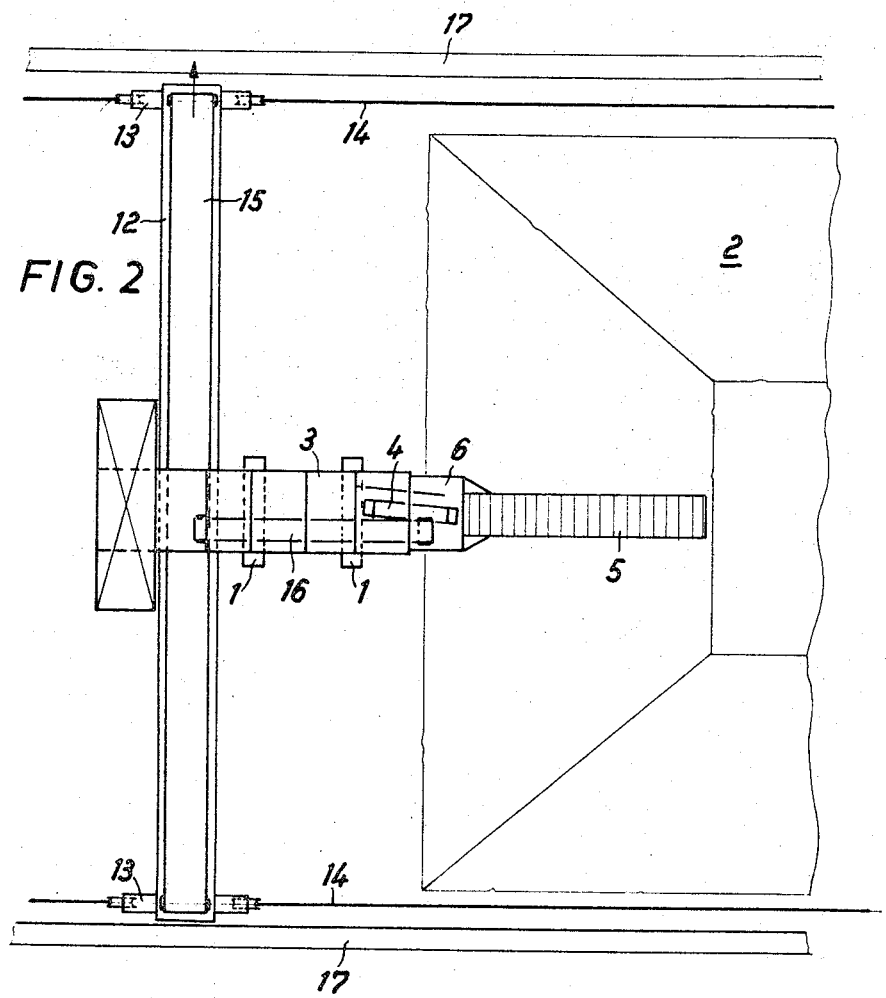
Inventor:
Robert Ziegenbein Aug. 29, 1967   R. ZIEGENBEIN   3,338,432
ARRANGEMENT FOR REMOVING POURABLE GOODS FROM A STORAGE PLACE
Filed Aug. 4, 1965   2 Sheets-Sheet 2
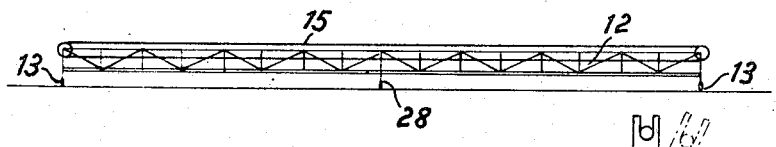
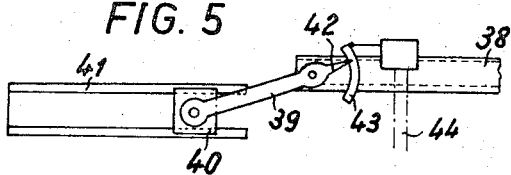
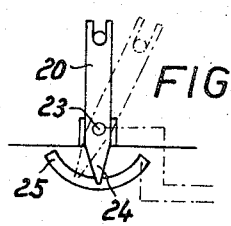
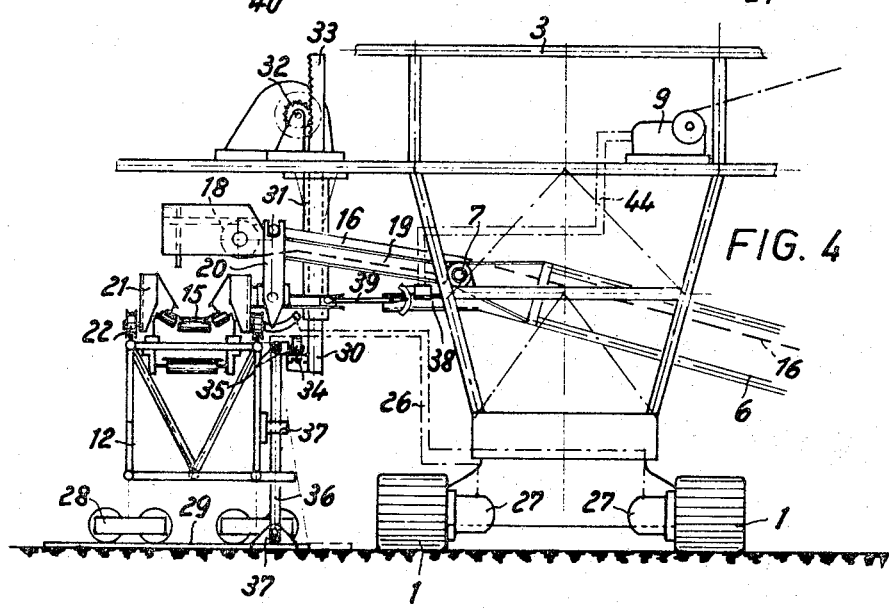
Inventor:
Robert Ziegenbein

United States Patent Office 3,338,432
Patented Aug. 29, 1967

3,338,432
ARRANGEMENT FOR REMOVING POURABLE
GOODS FROM A STORAGE PLACE
Robert Ziegenbein, Rheinberg, Germany, assignor to Beteiligungs- und Patentverwaltungsgesellschaft mit beschränkter Haftung, Essen, Germany
Filed Aug. 4, 1965, Ser. No. 477,233
Claims priority, application Germany, Aug. 8, 1964, B 78,029
5 Claims. (Cl. 214—10)

The present invention relates to an arrangement for removing pourable goods from a storage place by means of a pick-up device which is adapted to be moved back and forth along the slope or incline of the pile of pourable goods and conveys the picked up material to a conveyor which latter is mounted on a bridge extending along said slope or incline and being adapted to move in the direction toward and away from said slope.

With heretofore known arrangements of this type, the pick-up device, which comprises for instance a bucket-wheel and a scraper or a harrow, and the driving means therefor, is by means of a carriage movable on a bridge comprising the conveyor. In view of the considerable load acting on the bridge, the latter has to be designed rather heavy and consequently is expensive. This holds true all the more since for structural reasons the height of the girder of the bridge is limited. Thus, the heretofore known arrangements of the type involved have the further drawback that due to the considerable weight of the bridge and of the pick-up device carried by the bridge, the carriages provided at the ends of the bridge have to be correspondingly heavy. Therefore, also the rails on which the bridge is movable require a strong and consequently expensive foundation. In addition thereto, it may be mentioned that the pick-up device of heretofore known arrangements of the type involved can move only in the direction determined by the bridge. This in turn makes it more difficult to adapt said pick-up device to varying storage place conditions.

It is, therefore, an object of the present invention to provide an arrangement for removing pourable goods from storage places, which will overcome the above mentioned drawbacks.

It is another object of this invention to provide a device as set forth in the preceding paragraph, which will be considerably lighter and less expensive than heretofore known devices of the type involved.

These and other objects and advantages of the invention will appear more clearly from the following specification in connection with the accompanying drawings, in which:

FIGURE 1 diagrammatically illustrates a side view of a pick-up device according to the present invention which faces the incline of a pile of pourable goods to be removed.

FIG. 2 is a top view of the arrangement of FIG. 1.

FIGURE 3 is a side view of a bridge pertaining to a pick-up device according to the present invention.

FIGURE 4 illustrates on a somewhat larger scale than FIGURES 1 to 3 a cross section through the bridge and an end view of the pick-up device.

FIGURES 5 and 6 show details at a larger scale.

The above outlined drawbacks of heretofore known arrangements of the type involved have been overcome by the present invention due to the fact that the pick-up device is movable without exerting a load on the bridge while between the pick-up device and the bridge, control means are provided concerning the direction of movement of said pick-up device and said bridge toward and away from the pile to be removed. The upper structure of the pick-up device is advantageously pivotable relative to its movable understructure by a joint the axis of which is located in the driving direction of said pick-up device. In this connection, the upper structure of the pick-up device may carry the pick-up means, for instance a bucket-wheel, and a loosening device in the form of a harrow or a scraper. Furthermore, an automatic control device may act upon the upper structure of the pick-up device so as to maintain a certain inclination of the loosening device regardless of the ground conditions of the storage place. The driving movement of the pick-up device along the slope may be controlled for instance through the intervention of a feeler by the bridge which is preferably held stationary. It is also possible that the driving movement of the pick-up device along the slope of the pile to be removed is controlled independently of the bridge and that the bridge is coupled to the pick-up device. In this way a straight movement of the pick-up device may be controlled independently of the bridge, or the driving direction of the pick-up device is controlled by the conveyor output, for instance the specific digging depth of the bucket-wheel or the like. The said three possibilities can, of course, be combined in any desired manner. The bridge, the two ends of which rest upon carriages or one end of which rests upon a pivot bearing while the other end rests upon a carriage, may additionally be supported between its two ends by at least one additional carriage movable on a rail. Furthermore, for purposes of advancing the section or sections from time to time, it is possible to relative the bridge from the pick-up device. A device for advancing the rail section or sections is preferably mounted on the pick-up device.

Referring now to the drawings in detail, the pick-up device is formed by a bucket-wheel loader which by means of caterpillars 1 is movable on the storage place along the foot of the incline or slope of the pile 2 of pourable goods. The carriage of the device which instead of caterpillars may, of course, also have wheels, is adapted to be steered. The framework 3 of the device carries a bucket wheel 4 and a scraper chain 5. The bucket wheel 4 is carried by a boom 6 journalled in the framework by a joint 7 the axis of which extends in the driving direction of the caterpillars 1. The bucket wheel 4 can be raised and lowered by means of a hoist 8 from a winch 9. In this way, bucket-wheel 4 may be adjusted according to the desired height at the foot of the slope regardless of the ground conditions of the storage place. Furthermore, by means of a hoist 10, which is connected to a further drum of winch 9 the scraper chain 5 may be so adjusted that it will have the desired inclination corresponding to the slope of the pile to be removed. The boom carrying the scraper chain 5 is linked to the boom 6 in a joint 11. Parallel to the foot of the slope of the pile to be removed and extending over the storage place there is provided a conveyor bridge 12 both ends of which are supported by carriage 13 movable on rails 14 which extend on both sides of the pile 2 of pourable goods. Conveyor belt 15 supported by bridge 12 picks up the material which has been loosened by scraper chain 5 and from the latter has been conveyed to bucket-wheel 4 which latter conveys the material to a belt 16 which throws the material onto conveyor belt 15. Conveyor belt 15 conveys the material onto a conveyor belt 17 on either or both ends of the bridge. The discharging drum 18 of belt 16 is journalled at the end of a link 19 journalled in joint 7.

For purposes of example, it may be assumed that bridge 12 is held stationary during the operation of the pick-up device and that said pick-up device is connected to bridge 12 by means of the lever 19 which is supported by an upright stay 20 journalled on a feed carriage 21 rolling on rails 22 on both sides of belt 15, by means of a joint 23. When the pick-up device is travelling parallel to bridge 12 in the normal distance from it, stay 20 is standing perpendicularly. When said distance increases, stay 20 will be swung into the position shown in dash-lines in FIG. 6. Thus, a pointer 24 on the lower end of stay 20 is moved over a segment or arc-shaped portion 25 of a rheostat connected by lines 26 to steering means of the motors 27 of caterpillars 1. Thus, the steering arrangement of the pick-up device is so controlled that it again assumes the normal distance from bridge 12. When the pick-up device moves toward the bridge, stay 20 will swing in a direction opposite to the previous direction, thus causing said pick-up device to return to its normal position relative to bridge 12. It is also possible that the pick-up device is controlled independently of conveyor bridge 12 in such a way that it moves along a straight line. Bridge 12 is in this instance so coupled to the pick-up device that it will always maintain the proper distance from the pick-up device.

The control of the pick-up device may also be effected in such a way that it does not move under all conditions always along a straight line but its driving direction may be so determined that deviations from the delivery output will be corrected so that the delivery output will be held approximately constant. In this connection, for purposes of controlling the delivery output, the specific digging depth at which the bucket-wheel 4 works may be affected, for instance by changing the driving direction. Also in this instance conveyor bridge 12 is so coupled to the pick-up device that it will follow the pick-up device during its movement toward and away from pile 2.

When the pile 2 has a particularly great width, the bridge 12 will, of course, have to be correspondingly long. In such an instance the bridge may be additionally supported between its ends by an additional carriage 28. Such additional carriage moves on a rail section 29 which is parallel to rails 14. While the pick-up operation proceeds, it will be necessary from time to time to advance the rail section 29 or rail sections. To facilitate such operation, bridge 12 is relieved from the pick-up device by such means which will not interfere with the driving of the device along the bridge. This will be done by a bar 30 which is in perpendicular direction guided by a tube 31 extending beneath from the framework 3. The bar 30 can be raised and lowered by means of a gear 32 meshing with a rack 33 constituting the upper end of bar 30. The lower end of bar 30 has a projection which supports a roll 34 journalled on a short side of an angle lever. This lever is journalled on bridge 12 in a joint 35 the axis of which is parallel to bridge 12. The longer side 36 of said angle lever extends downwards its lower end engaging a slot in a coupling member 37 at rail section 29. When side 36 of said angle lever is secured to bridge 12 by fastening means 37 bridge 12 can be relieved through the pick-up device by driving gear 32 for raising bar 30. The advancing of rail section or rail sections 29 is advantageously effected by disconnecting the fastening means 37 and raising bar 30. Thus, said angle lever is pivoted from its full-line position to its dash-line position whereby the rail section 29 or rail sections are advanced.

Inasmuch as no load is exerted by the pick-up device upon the bridge 12 and the latter is even relieved from said pick-up device, bridge 12 can be designed considerably lighter than corresponding bridges with heretofore known arrangements for picking up pourable goods. Moreover, the pick-up device according to the present invention can easily adjust itself to an irregular contour of the slope of the pourable material. The invention is not limited to a straight line advance of the pick-up operation but is also applicable when the pile of pourable goods has a circular bottom. In this instance, the bridge is movable on concentric circular rails or at one end on a pivot bearing and at the other end on a circular rail.

Boom 6 has an arm 38 extending rearwardly from joint 7. Arm 38 is by means of a link 39 connected to a sliding member 40 guided horizontally by rails 41 and secured to the feed carriage 21. When the bucket-wheel 4 is lowered, arm 38 is raised as will be seen from FIG. 5. Thus, link 39 is turned relatively to arm 38, and a pointer 42 on the rear end of link 39 slides over a segment or arc-shaped member 43 of a rheostat connected by lines 44 to steering member 43 of the motor of winch 9. The winch 9 will by means of hoist 8 raise lever 6 with bucket-wheel 4. When the bucket-wheel is raised above the proper working position relative to pile 2, arm 38 is lowered and thus the described steering mechanism will cause winch to lower wheel 4. In this way, without the action of the operation and independently of the ground conditions of the storage place there will always be assured the proper location of the bucket-wheel 4 and of the scraper 5.

Conveyor bridge 12 advantageously also carries the cables for feeding electric energy to the pick-up device.

It is, of course, to be understood that the present invention is, by by no means, limited to the particular constructions shown in the drawings but also comprises any modifications within the scope of the appended claims.

What I claim is:

1. An arrangement for removing pourable material from a pile on a storage place, which comprises: a pick-up device having a carriage operable to move said pick-up device along the pile to be removed and forming a first unit, conveyor means adapted to receive material picked up by said pick-up device from the latter for conveying it away from said storage place, bridge means supporting said conveyor means and together therewith forming a second unit, said bridge means being movable toward and away from the pile to be removed, at least a portion of said pick-up device when in operation being located between the pile to be removed and said bridge means, and control means arranged between said pick-up device and said bridge means and including feeler means controlled by said bridge means for controlling and operable to control the movement of said pick-up device relative to the pile to be removed.

2. An arrangement for removing pourable material from a pile on a storage place, which comprises: a pick-up device forming a first unit and having an under-structure including a carriage and also having an upper structure supported by said under-structure and pivotally connected to and supported by said under-structure, the axis of the pivotal connection of said upper structure with said under-structure being located in the driving direction of said carriage, material loosening means carried by said under-structure and pivotably connected thereto for engaging and loosening the material of the pile to be removed, automatic control means supported by said upper structure for maintaining said loosening means inclined with regard to a horizontal plane regardless of the ground conditions of the storage place, bridge means separate from said pick-up device and forming a second unit, conveyor means supported by said bridge means for receiving material picked up by said pick-up device and adapted to convey the material away from said storage place, at least a portion of said pick-up device being located between the pile to be removed and said bridge means when said pick-up device is in operation, and control means arranged between and operatively connected to said pick-up device and said bridge and operable to control the movement of at least one of said units with regard to the pile to be removed.

3. An arrangement for removing pourable material from a pile on a storage place, which comprises: a pick-up device having a carriage operable to move said pick-up device along the pile to be removed and forming a first unit, conveyor means adapted to receive material pick-up by said pick-up device from the latter for conveying it away from said storage place, bridge means supporting said conveyor means and together therewith forming a second unit, carriages movable on rail means and supporting both of the ends of said bridge means to permit movement of said bridge means toward and away from the pile to be removed, additional carriage means movable on additional rail means and supporting an intermdiate portion of said bridge means between said two end portions, at least a portion of said pick-up device when in operation being located between the pile to be removed and said bridge means, and control means arranged between and operatively connected to said pick-up device and said bridge means, and operable to control the movements of at least one of said two units relative to the pile to be removed.

4. An arrangement according to claim 3, which includes means for relieving said bridge means to facilitate advancing the rail means supporting said additional carriage means which supports said intermediate portion.

5. An arrangement according to claim 4, which includes means operable to engage said additional rail means for advancing the same.

References Cited

UNITED STATES PATENTS

| | | | |
|---|---|---|---|
| 2,734,642 | 2/1956 | Mercier | 214—10 |
| 3,052,050 | 9/1962 | Wilms et al. | 198—9 |
| 3,104,766 | 9/1963 | Sasadi | 214—14 |
| 3,225,943 | 12/1965 | Sasadi | 214—10 |

FOREIGN PATENTS 362,436 10/1922 Germany.

GERALD M. FORLENZA, *Primary Examiner.*

MARVIN A. CHAMPION, *Examiner.*